United States Patent [19]
Wilkinson et al.

[11] Patent Number: 5,976,726
[45] Date of Patent: Nov. 2, 1999

[54] ELECTROCHEMICAL CELL WITH FLUID DISTRIBUTION LAYER HAVING INTEGRAL SEALING CAPABILITY

[75] Inventors: David P. Wilkinson, North Vancouver; Juergen Stumper, Vancouver; Stephen A. Campbell, Maple Ridge; Michael T. Davis, Port Coquitlam; Gordon J. Lamont, New Westminster, all of Canada

[73] Assignee: Ballard Power Systems Inc., Burnaby, Canada

[21] Appl. No.: 08/846,653

[22] Filed: May 1, 1997

[51] Int. Cl.⁶ .................................................. H01M 8/02
[52] U.S. Cl. ................................................ 429/35; 429/32
[58] Field of Search ................................. 429/32, 35, 38, 429/39

[56] References Cited

U.S. PATENT DOCUMENTS

| | | | |
|---|---|---|---|
| 3,679,485 | 7/1972 | Kohlmuller et al. | 429/38 X |
| 4,219,611 | 8/1980 | Breault | 429/38 X |
| 4,555,324 | 11/1985 | Ueno et al. | 204/284 |
| 4,983,472 | 1/1991 | Katz et al. | 429/38 |
| 5,176,966 | 1/1993 | Epp et al. | 429/26 |
| 5,219,674 | 6/1993 | Singelyn et al. | 429/36 |
| 5,284,718 | 2/1994 | Chow et al. | 429/26 |
| 5,441,621 | 8/1995 | Molter et al. | 429/35 X |
| 5,480,735 | 1/1996 | Landsman et al. | 429/13 |
| 5,523,175 | 6/1996 | Beal et al. | 429/30 |
| 5,565,072 | 10/1996 | Faita et al. | 204/256 |

FOREIGN PATENT DOCUMENTS

| | | |
|---|---|---|
| 0174762 | 3/1986 | European Pat. Off. . |
| 0629015 | 12/1994 | European Pat. Off. . |
| 0690519 | 7/1995 | European Pat. Off. . |
| 0774794 | 5/1997 | European Pat. Off. . |
| 4206490 | 9/1993 | Germany . |
| 5-101837 | 4/1993 | Japan . |
| 7-296818 | 11/1995 | Japan . |
| 8-124583 | 5/1996 | Japan . |
| 8-148170 | 6/1996 | Japan . |
| WO 94 09519 | 4/1994 | WIPO . |
| WO 95 16287 | 6/1995 | WIPO . |
| WO 97 08766 | 3/1997 | WIPO . |
| WO 97 13287 | 4/1997 | WIPO . |

OTHER PUBLICATIONS

"Stainless Steel Mesh Flow–Fields For Polymer Electrolyte Fuel Cells", Program and Abstracts, 1996 Fuel Cell Seminar, Orlando, Florida. Zawodzinski et al. Nov. 1996.

"Fine Expanded Metals" product brochure. Exmet Corporation. Unknown date.

"Decorative Expanded Metals" product brochure. Exmet Corporation. Unknown date.

*Primary Examiner*—Stephen Kalafut
*Attorney, Agent, or Firm*—McAndrews, Held & Malloy, Ltd.

[57] ABSTRACT

An electrochemical fuel cell comprises a pair of separator plates and a pair of fluid distribution layers interposed between the separator plates. At least one of the fluid distribution layers comprises a sealing region and an electrically conductive, fluid permeable active region, and a preformed sheet material extending into each of the sealing region and the active region. An ion exchange membrane is interposed between at least a portion of the fluid distribution layers, and a quantity of electrocatalyst is interposed between at least a portion of each of the fluid distribution layers and at least a portion of the membrane, thereby defining the active region. Compression of the preformed sheet material by urging of the pair of plates towards each other renders the at least one fluid distribution layer substantially fluid impermeable in a direction parallel to the major planar surfaces, in the sealing region. The performed sheet material included in the at least one fluid distribution layer thus has intrinsic sealing capability. This approach reduces or eliminates the need for separate gaskets or sealing components and integrates several functions, such as sealing, fluid distribution, and current collection, in a single layer.

30 Claims, 7 Drawing Sheets

ELECTROCHEMICAL CELL WITH FLUID DISTRIBUTION LAYER HAVING INTEGRAL SEALING CAPABILITY

FIELD OF THE INVENTION

This invention relates generally to electrochemical cells and, more particularly, to an electrochemical fuel cell with a fluid distribution layer having integral sealing capability.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two fluid distribution (electrode substrate) layers formed of electrically conductive sheet material. The fluid distribution layer has a porous structure across at least a portion of its surface area which renders it permeable to fluid reactants and products in the fuel cell. The electrochemically active region of the MEA also includes a quantity of electrocatalyst, typically disposed in a layer at each membrane/fluid distribution layer interface, to induce the desired electrochemical reaction in the fuel cell. The electrodes thus formed are electrically coupled to provide a path for conducting electrons between the electrodes through an external load.

At the anode, the fluid fuel stream moves through the porous portion of the anode fluid distribution layer and is oxidized at the anode electrocatalyst. At the cathode, the fluid oxidant stream moves through the porous portion of the cathode fluid distribution layer and is reduced at the cathode electrocatalyst.

In electrochemical fuel cells employing hydrogen as the fuel and oxygen as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

Anode reaction: $H_2 \rightarrow 2H^+ + 2e^-$

Cathode reaction: $\frac{1}{2}O_2 + 2H^+ + 2e^- \rightarrow H_2O$

In electrochemical fuel cells employing methanol as the fuel supplied to the anode (so-called "direct methanol" fuel cells) and an oxygen-containing stream, such as air (or substantially pure oxygen) as the oxidant supplied to the cathode, the methanol is oxidized at the anode to produce protons and carbon dioxide. Typically, the methanol is supplied to the anode as an aqueous solution or as a vapor. The protons migrate through the ion exchange membrane from the anode to the cathode, and at the cathode electrocatalyst layer, oxygen reacts with the protons to form water. The anode and cathode reactions in this type of direct methanol fuel cell are shown in the following equations:

Anode reaction: $CH_3OH + H_2O \rightarrow 6H^+ + CO_2 + 6e^-$

Cathode reaction: $3/2 O_2 + 6H^+ + 6e^- \rightarrow 3H_2O$

In electrochemical fuel cells, the MEA is typically interposed between two separator plates or fluid flow field plates (anode and cathode plates). The plates typically act as current collectors, provide support to the MEA, and prevent mixing of the fuel and oxidant streams in adjacent fuel cells, thus, they are typically electrically conductive and substantially fluid impermeable. Fluid flow field plates typically have channels, grooves or passages formed therein to provide means for access of the fuel and oxidant streams to the surfaces of the porous anode and cathode layers, respectively.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell, hence the plates are sometimes referred to as bipolar plates. Such a series connected multiple fuel cell arrangement is referred to as a fuel cell stack. The stack typically includes manifolds and inlet ports for directing the fuel and the oxidant to the anode and cathode fluid distribution layers, respectively. The stack also usually includes a manifold and inlet port for directing the coolant fluid to interior channels within the stack. The stack also generally includes exhaust manifolds and outlet ports for expelling the unreacted fuel and oxidant streams, as well as an exhaust manifold and outlet port for the coolant fluid exiting the stack.

The fluid distribution layer in electrochemical fuel cells has several functions, typically including:

(1) to provide access of the fluid reactants to the electrocatalyst;

(2) to provide a pathway for removal of fluid reaction product (for example, water in hydrogen/oxygen fuel cells and water and carbon monoxide in direct methanol fuel cells);

(3) to serve as an electronic conductor between the electrocatalyst layer and the adjacent separator or flow field plate;

(4) to serve as a thermal conductor between the electrocatalyst layer and the adjacent separator or flow field plate;

(5) to provide mechanical support for the electrocatalyst layer;

(6) to provide mechanical support and dimensional stability for the ion exchange membrane.

The fluid distribution layer is electrically conductive across at least a portion of its surface area to provide an electrically conductive path between the electrocatalyst reactive sites and the current collectors. Materials which have been employed in fluid distribution layers in solid polymer electrochemical fuel cells include:

(a) carbon fiber paper;

(b) woven and non-woven carbon fabric—optionally filled with electrically conductive filler such as carbon particles and a binder;

(c) metal mesh or gauze - optionally filled with electrically conductive filler such as carbon particles and a binder;

(d) polymeric mesh or gauze, such as polytetrafluoroethylene mesh, rendered electrically conductive, for example, by filling with electrically conductive filler such as carbon particles and a binder.

(e) microporous polymeric film, such as microporous polytetrafluoroethylene, rendered electrically conductive, for example, by filling with electrically conductive filler such as carbon particles and a binder.

Thus, fluid distribution layers typically comprise preformed sheet materials which are electrically conductive and fluid permeable in the region corresponding to the electrochemically active region of the fuel cell.

Conventional methods of sealing around MEAs within fuel cells include framing the MEA with a resilient fluid impermeable gasket, placing preformed seal assemblies in channels in the fluid distribution layer and/or separator plate, or molding seal assemblies within the fluid distribution layer or separator plate, circumscribing the electrochemical active region and any fluid manifold openings. Examples of such conventional methods are disclosed in U.S. Pat. Nos. 5,176,966 and 5,284,718. Disadvantages of these conventional approaches include difficulty in assembling the sealing mechanism, difficulty in supporting narrow seal assemblies within the fluid distribution layer, localized and uneven mechanical stresses applied to the membrane and seal assemblies, and seal deformation and degradation over the lifetime of the fuel cell stack.

Such gaskets and seals, which are separate components introduced in additional processing or assembly steps, add complexity and expense to the manufacture of fuel cell stacks.

SUMMARY OF THE INVENTION

An electrochemical fuel cell comprises:

(a) a pair of substantially fluid impermeable separator plates;

(b) a pair of fluid distribution layers interposed between the separator plates, each of the fluid distribution layers having two major planar surfaces, at least one of the fluid distribution layers comprising a sealing region and an electrically conductive, fluid permeable active region, the at least one fluid distribution layer comprising a preformed sheet material extending into each of the sealing region and the active region;

(c) an ion exchange membrane interposed between at least a portion of the fluid distribution layers;

(d) a quantity of electrocatalyst interposed between at least a portion of each of the fluid distribution layers and at least a portion of the membrane, thereby defining the active region.

Compression of the preformed sheet material by urging of the pair of plates towards each other renders the at least one fluid distribution layer substantially fluid impermeable in a direction parallel to the major planar surfaces, in the sealing region. Thus, the performed sheet material included in the at least one fluid distribution layer has intrinsic sealing capability.

In a preferred electrochemical fuel cell, both of the fluid distribution layers comprise a sealing region and an electrically conductive, fluid permeable active region, and both comprise a preformed sheet material extending into each of the sealing region and the active region.

In preferred embodiments the membrane superposes at least a portion of the sealing region.

The fluid distribution layer may be electrically insulating in the sealing region.

In a first embodiment of an electrochemical fuel cell the preformed sheet material is an electrically conductive mesh, which may optionally contain an electrically conductive filler at least in the active region. The mesh may consist essentially of a metal, preferably nickel, stainless steel, niobium or titanium.

In a second embodiment of an electrochemical fuel cell the preformed sheet material is an electrical insulating mesh, which is rendered electrically conductive at least in the active region. For example, preferably the mesh contains an electrically conductive filler at least in the active region. Preferably the mesh consists essentially of a polymeric material, such as, for example polyethylene, polypropylene or polytetrafluoroethylene.

The term mesh as used herein includes woven meshes and expanded mesh materials, such as those available from Exmet Corporation, Naugatuk, CT.

In a third embodiment of an electrochemical fuel cell, the preformed sheet material is a substantially fluid impermeable sheet material, the sheet material rendered fluid permeable in the active region. For example, the substantially fluid impermeable sheet material is perforated, at least in the active region, to render it fluid permeable. The perforations may vary in their shape, size and spacing. The substantially fluid impermeable sheet material may be an electrically conductive sheet material, and may comprise an electrically conductive filler within perforations in the perforated active region. Graphite foil is a preferred electrically conductive material. Alternatively, the substantially fluid impermeable sheet material may be an electrical insulator which is rendered electrically conductive in the active region. In this case, the fluid distribution layer preferably comprises an electrically conductive filler within perforations in the perforated active region. The electrically insulating sheet material may consist essentially of a polymeric material, such as polytetrafluoroethylene or an elastomer such as Santoprene brand rubber available through Monsanto Company.

In an alternative aspect, an electrochemical fuel cell comprises:

(a) a pair of substantially fluid impermeable separator plates;

(b) a pair of fluid distribution layers interposed between the separator plates, each of the fluid distribution layers having two major planar surfaces, at least one of the fluid distribution layers comprising a sealing region and an electrically conductive, fluid permeable active region, the at least one fluid distribution layer comprising a porous electrically insulating sheet material extending into each of the active region and the sealing region;

(c) an ion exchange membrane interposed between at least a portion of the fluid distribution layers;

(d) a quantity of electrocatalyst interposed between at least a portion of each of the fluid distribution layers and at least a portion of the membrane, thereby defining the active region.

The porous polymeric sheet material contains an electrically conductive filler in the active region and a sealing filler in the sealing region, thereby rendering the fluid distribution layer substantially fluid impermeable in the sealing region.

In some embodiments, the porous electrically insulating sheet material consists essentially of a polymeric material. The polymeric material may be microporous. Suitable polymeric materials include polyethylene, polypropylene and polytetrafluoroethylene.

The porous electrically insulating sheet material may be in the form of a mesh. Another suitable material is glass fiber mat.

Preferably the sealing filler comprises a flow processible material, preferably an elastomer, such as, for example, silicon rubber.

In any of the embodiments described above, at least one of the fluid distribution layers may comprise at least one channel, for directing a fluid reactant stream, formed in at least one of the major planar surfaces thereof. The at least one channel preferably traverses the active region.

In any of the embodiments described above, at least one of the separator layers may comprise at least one channel formed in a major surface thereof facing a fluid distribution layer, for directing a fluid reactant stream in contact with the layer.

The separator plates, the preformed sheet material, the fluid distribution layer may be deformable or resilient under compression or may be substantially rigid. In any of the embodiments described above, a fluid distribution layer may comprise one or more layers of material.

Preferred electrically conductive fillers comprise a binder and electrically conductive particles, such as, carbon particles and/or boron carbide particles. The electrically conductive filler may comprise a catalyst and/or an ionomer.

In any of the above embodiments, the sealing region may have at least one fluid manifold opening formed therein.

DETAILED DESCRIPTION OF THE PREFERRED EMBODIMENTS

Figure 1:
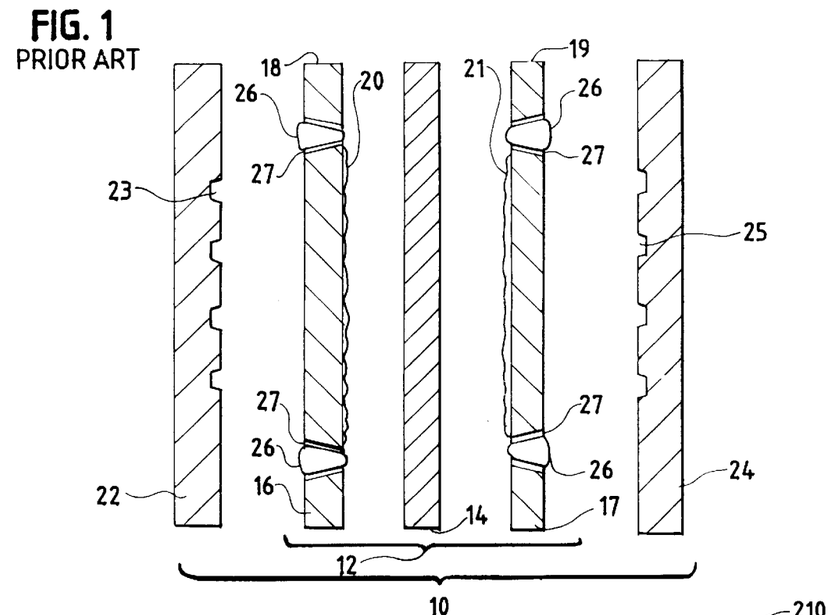
FIG. 1 is an exploded sectional view of a conventional (prior art) solid polymer electrochemical fuel cell showing an MEA interposed between two flow field plates.

FIG. 1 illustrates a typical (prior art) solid polymer fuel cell 10. Fuel cell 10 includes an MEA 12 including an ion exchange membrane 14 interposed between two electrodes, namely, an anode 16 and a cathode 17. Anode 16 includes a porous electrically conductive fluid distribution layer 18. A thin layer of electrocatalyst 20 is disposed at the interface with the membrane 14, thereby defining an electrochemically active region of fluid distribution layer 18. Cathode 17 includes a porous electrically conductive fluid distribution layer 19. A thin layer of electrocatalyst 21 is disposed at the interface with the membrane 14, thereby defining an electrochemically active region of fluid distribution layer 19. The MEA is interposed between anode flow field plate 22 and cathode flow field plate 24. Anode flow field plate 22 has at least one fuel flow channel 23 formed in its surface facing the anode fluid distribution layer 18. Cathode flow field plate 24 has at least one oxidant flow channel 25 formed in its surface facing the cathode fluid distribution layer 19. When assembled against the cooperating surfaces of the fluid distribution layers 18 and 19, channels 23 and 25 form reactant flow field passages for the fuel and oxidant, respectively. Membrane electrode assembly 12 also includes preformed gaskets 26 placed within channels 27 which extend through the thickness of the fluid distribution layers 18 and 19. When the fuel cell 10 is assembled and compressed, by urging plates 22 and 24 towards each other, the gaskets 26 cooperate with the plates 22, 24 and the membrane 14 to form a seal circumscribing the electrochemically active region of each fluid distribution layer 18, 19.

Figure 2A:
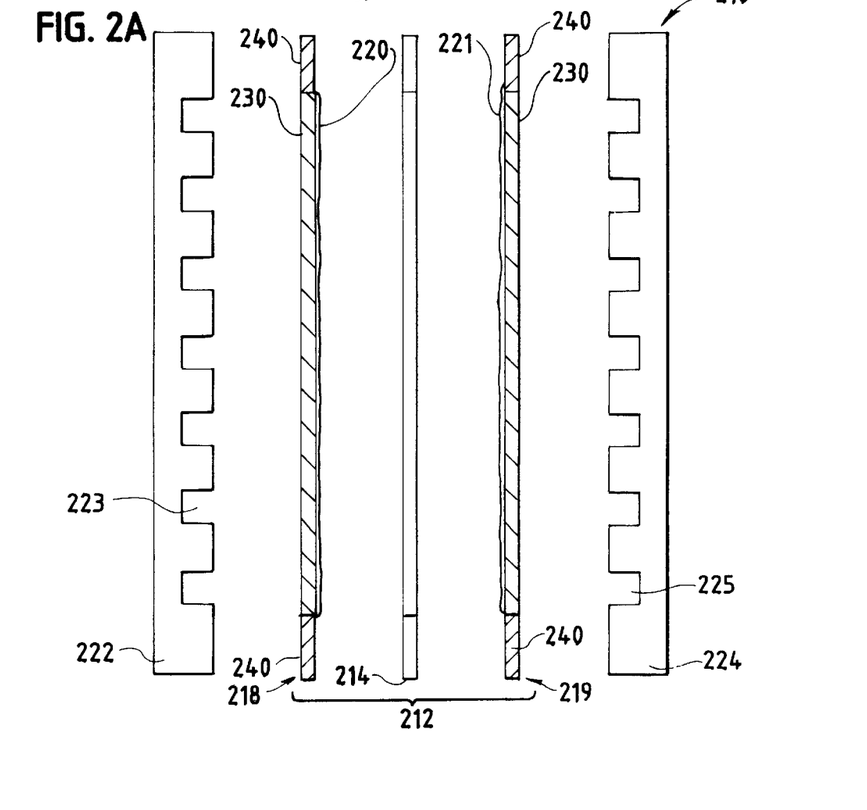
FIG. 2A is an exploded sectional view, in the direction of arrows A—A in FIG. 2B, of an electrochemical fuel cell which includes a pair of fluid flow field plates and a pair of fluid distribution layers with integral sealing capability. The fluid distribution layers include a mesh sheet material.
Figure 2B:
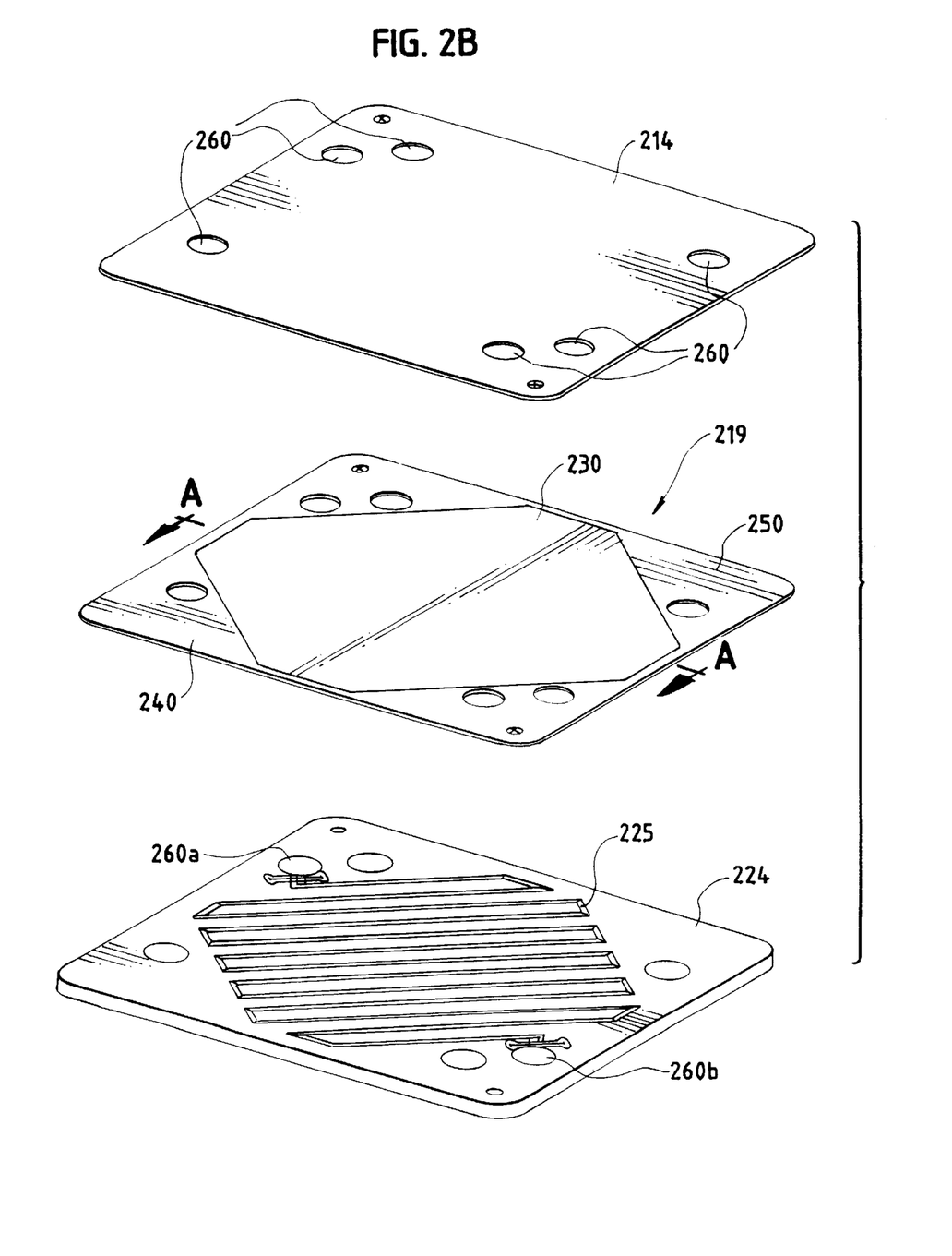
FIG. 2B is an exploded isometric view of a portion of the fuel cell of FIG. 2A.

FIG. 2A is an exploded sectional view of an electrochemical fuel cell 210, a portion of which is shown in FIG. 2B in an exploded isometric view. Fuel cell 210 includes a membrane electrode assembly 212, which includes an ion exchange membrane 214 interposed between a pair of fluid distribution layers 218 and 219. A quantity of electrocatalyst is disposed in a layer 220, 221 at the interface between each fluid distribution layer 218, 219 and membrane 214 in the electrochemically active region 230 of the fluid distribution layers 218, 219. The catalyst may be applied to the membrane or to the fluid distribution layer. The MEA 212 is interposed between a pair of flow field plates 222 and 224. Each plate 222, 224 has an open-faced channel 223, 225 formed in its surface facing the corresponding fluid distribution layer 218, 219, respectively, and traversing a portion of each plate which superposes the electrochemically active region 230. When assembled against the cooperating surfaces of the fluid distribution layers 218 and 219, channels 223 and 225 form reactant flow field passages for the fuel and oxidant, respectively.

Fluid distribution layers 218, 219 each have a sealing region 240. In the illustrated embodiment, ion exchange membrane 214 superposes sealing region 240. In the electrochemically active region 230, the fluid distribution layers 218, 219 are electrically conductive and fluid permeable, to permit the passage of reactant fluid between the two major planar surfaces thereof to access the electrocatalyst layer 220, 221 respectively. In the embodiment illustrated in FIGS. 2A and 2B, fluid distribution layers include a mesh sheet material 250 extending into each of the active and sealing regions 230, 240, respectively. The mesh sheet material 250 may be formed from an electrically conductive material such as a metal or from a polymeric material which is electrically insulating. If the mesh is electrically insulating the fluid distribution layer is rendered electrically conductive in the active region 230, for example, it may contain an electrically conductive filler, at least in the region 230. In preferred embodiments, the mesh contains an electrically conductive filler even if the mesh is electrically conductive. Compression of mesh sheet material 250 in fluid distribution layers 218, 219 between membrane 214 and plates 222, 224 respectively, renders the fluid distribution layers substantially fluid impermeable in a direction parallel to their major planar surfaces in the sealing region 240. Thus, sealing, around the periphery of the active region 240, is accomplished by utilizing the intrinsic sealing capability of the mesh sheet material 250 when it is interposed and compressed between two substantially fluid impermeable layers. Suitable mesh materials include expanded materials available from Exmet Corporation, Naugatuk, Conn.

As shown in FIG. 2B, each of membrane 214, fluid distribution layers 218, 219, reactant flow field plates 222, 224, has a plurality of openings 260 formed therein, which align when assembled to form manifolds for directing inlet and outlet fluid streams through fuel cell 210. For example, oxidant fluid flow field channel 225 extends between oxidant inlet manifold opening 260a and oxidant outlet manifold 260b formed in plate 224. The fluid manifold openings 260 in fluid distribution layers 218, 219 are formed in sealing region 240. Openings, 260, need not necessarily be formed in the mesh material of the fluid distribution layer, as the fluid passing through the manifold can generally readily pass through the mesh material.

In an alternative embodiment, fluid distribution layers 218, 219 could include a porous electrically insulating sheet material which contains an electrically conductive filler in active region 230, and a sealing filler in sealing region 240, to render the fluid distribution layer substantially fluid impermeable in the sealing region. Suitable porous electrically insulating sheet materials include, for example, glass fiber mat, plastic meshes and microporous polymeric film. The sealing filler impregnates and substantially fills the pores of the porous material to render it substantially fluid impermeable. Thus, in this approach, it is the sealing filler which, in the sealing region, imparts an integral sealing capability to the fluid distribution layer.

Figure 3A:
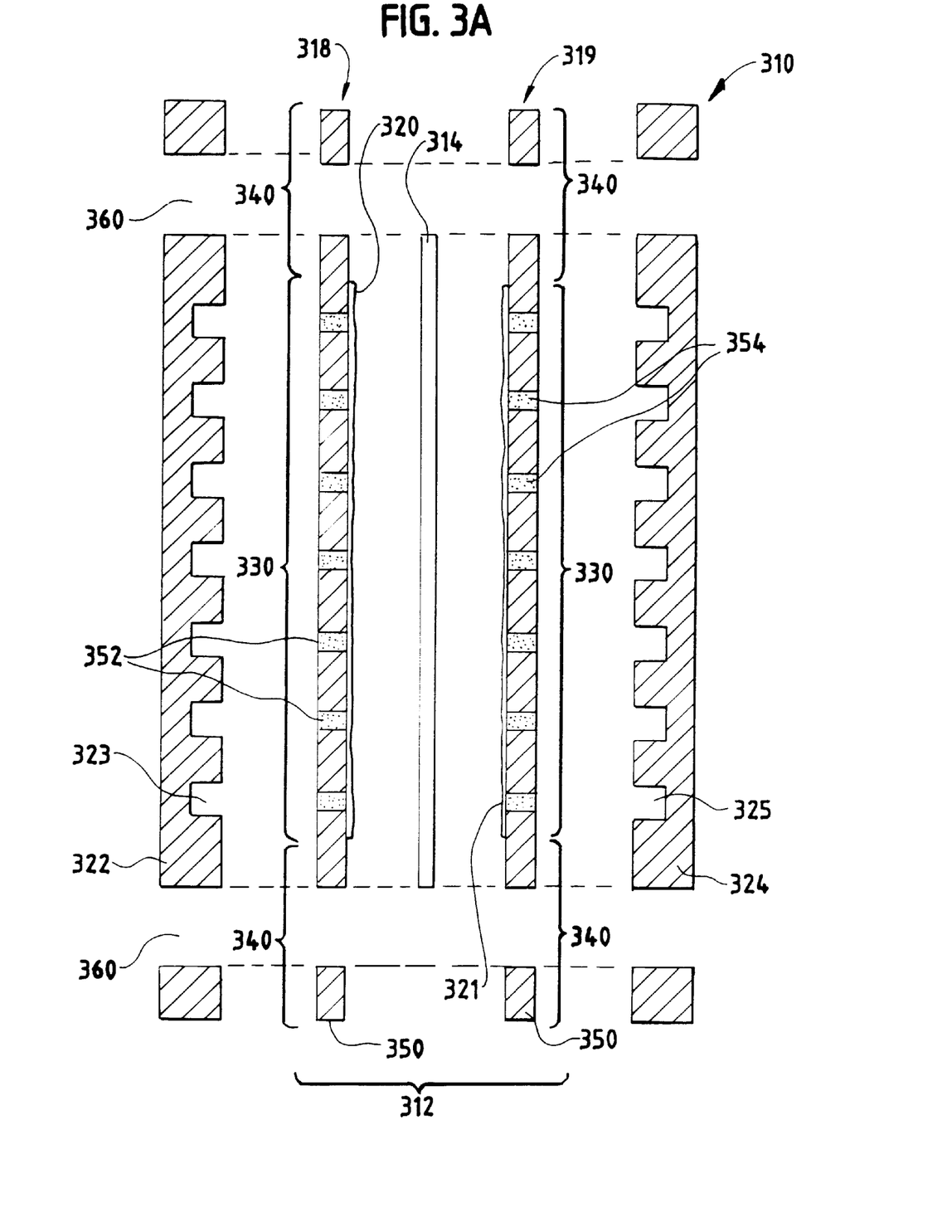
FIG. 3A is an exploded sectional view, in the direction of arrows B—B in FIG. 3B, of an electrochemical fuel cell which includes a pair of fluid flow field plates and a pair of fluid distribution layers with integral sealing capability. The fluid distribution layers include a substantially fluid impermeable sheet material having plurality of perforations formed in the electrochemically active region thereof.
Figure 3B:
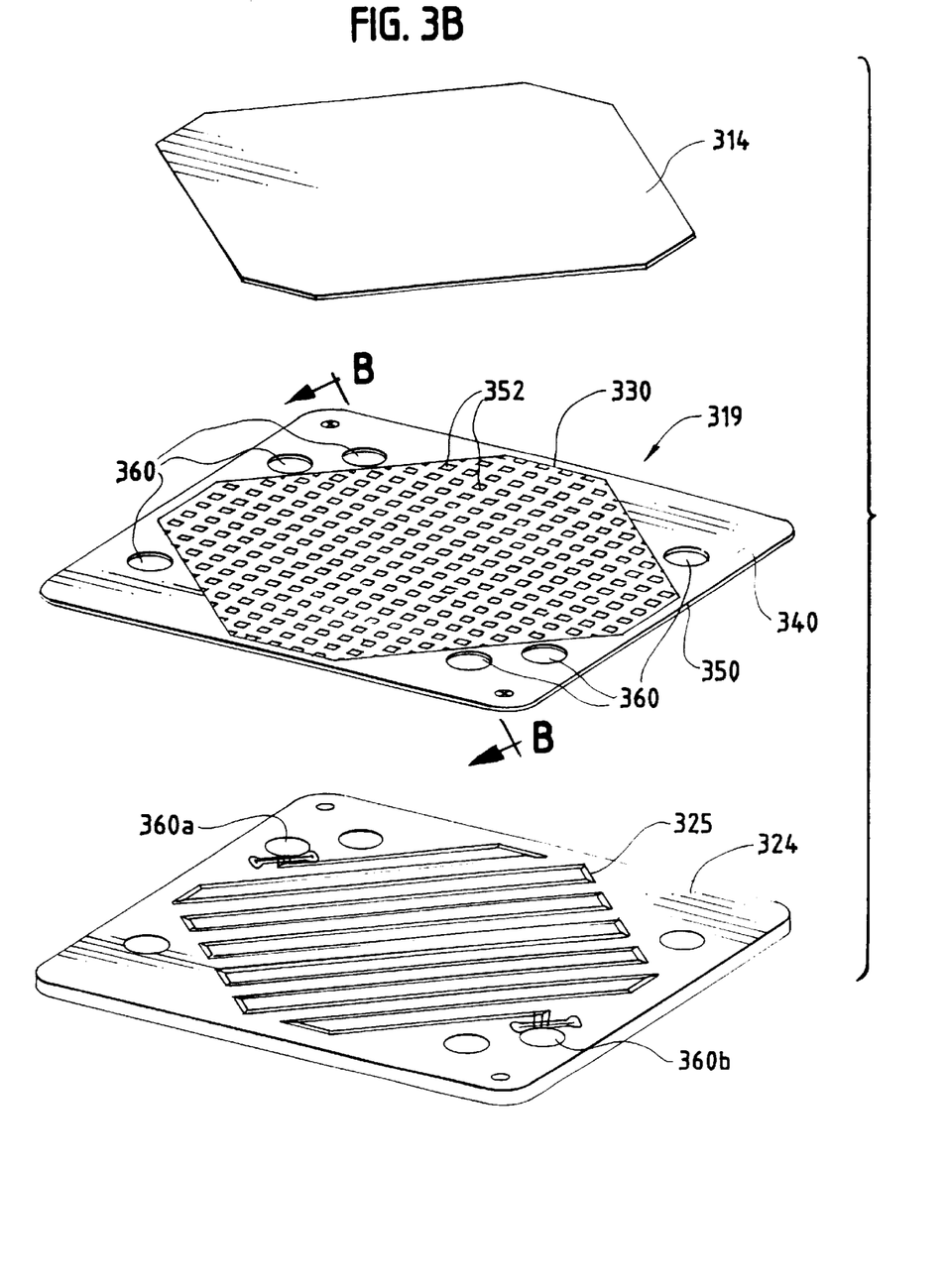
FIG. 3B is an exploded isometric view of a portion of the fuel cell of FIG. 3A.

FIG. 3A is an exploded sectional view of an electrochemical fuel cell 310, a portion of which is shown in FIG. 3B in an exploded isometric view. Again, fuel cell 310 includes a membrane electrode assembly 312, including an ion exchange membrane 314 interposed between a pair of fluid distribution layers 318 and 319, with a quantity of electrocatalyst disposed in a layer 320, 321 at the interface between each fluid distribution layer 318, 319 and membrane 314 in the electrochemically active region 330 of the fluid distribution layers 318, 319. The MEA 312 is interposed between a pair of flow field plates 322 and 324, each plate having an open-faced channel 323, 325 formed in its surface facing the corresponding fluid distribution layer 318, 319, respectively, as described for FIGS. 2A and 2B above.

Fluid distribution layers 318, 319 each have a sealing region 340. In the illustrated embodiment, ion exchange membrane 314 superposes only a portion of the sealing region 340 circumscribing the active region 330. The membrane 314 does not superpose entire sealing region 340. In the electrochemically active region 330, the fluid distribution layers 318, 319 are electrically conductive and fluid permeable. In the embodiment illustrated in FIGS. 3A and 3B, fluid distribution layers include substantially fluid impermeable sheet material 350 extending into each of the active and sealing regions 330, 340, respectively. The sheet material 350 is perforated at least in the electrochemically active region, rendering it fluid permeable, to permit the passage of reactant fluid between the two major planar surfaces thereof for access to the electrocatalyst layer 320, 321 respectively. In the illustrated embodiment, the substantially fluid impermeable sheet material 350 is formed from an electrically insulating polymeric material such as polytetrafluoroethylene or an elastomer such as Santoprene brand rubber available through Monsanto Company. As the sheet material 350 is electrically insulating, the fluid distribution layer is rendered electrically conductive in the active region 330. For example, the perforations 352 may contain an electrically conductive filler 354. Compression of sheet material 350 in fluid distribution layers 318, 319 between membrane 314 and plates 322, 324 respectively, renders the fluid distribution layers substantially fluid impermeable in a direction parallel to their major planar surfaces in the sealing region 340, by virtue of the fluid impermeability of the sheet material 350 which extends into the sealing region 340.

As shown in FIG. 3B, each of the fluid distribution layers 318, 319, and reactant flow field plates 322, 324, has a plurality of openings 360 formed therein, which align when assembled to form manifolds for directing inlet and outlet fluid streams through fuel cell 310, as described above. For example, oxidant fluid flow field channel 325 extends between oxidant inlet manifold opening 360a and oxidant outlet manifold 360b formed in plate 324. The two fluid distribution layers 318, 319 and the reactant flow field plates 322, 324 cooperate to form a seal circumscribing the manifold openings 360. Whereas sealing around the periphery of the active region 340 in the embodiment of FIGS. 3A and 3B, is accomplished by utilizing the intrinsic sealing capability of the sheet material 350 when it is interposed and compressed between the plates 322, 324 and the membrane 314. If the fluid distribution layers 318, 319 are electrically conductive in sealing region 340 and membrane 314 does not superpose the entire sealing region 340, an electrical insulator would need to be interposed between layers 318, 319 to prevent short circuiting.

Figure 4A:
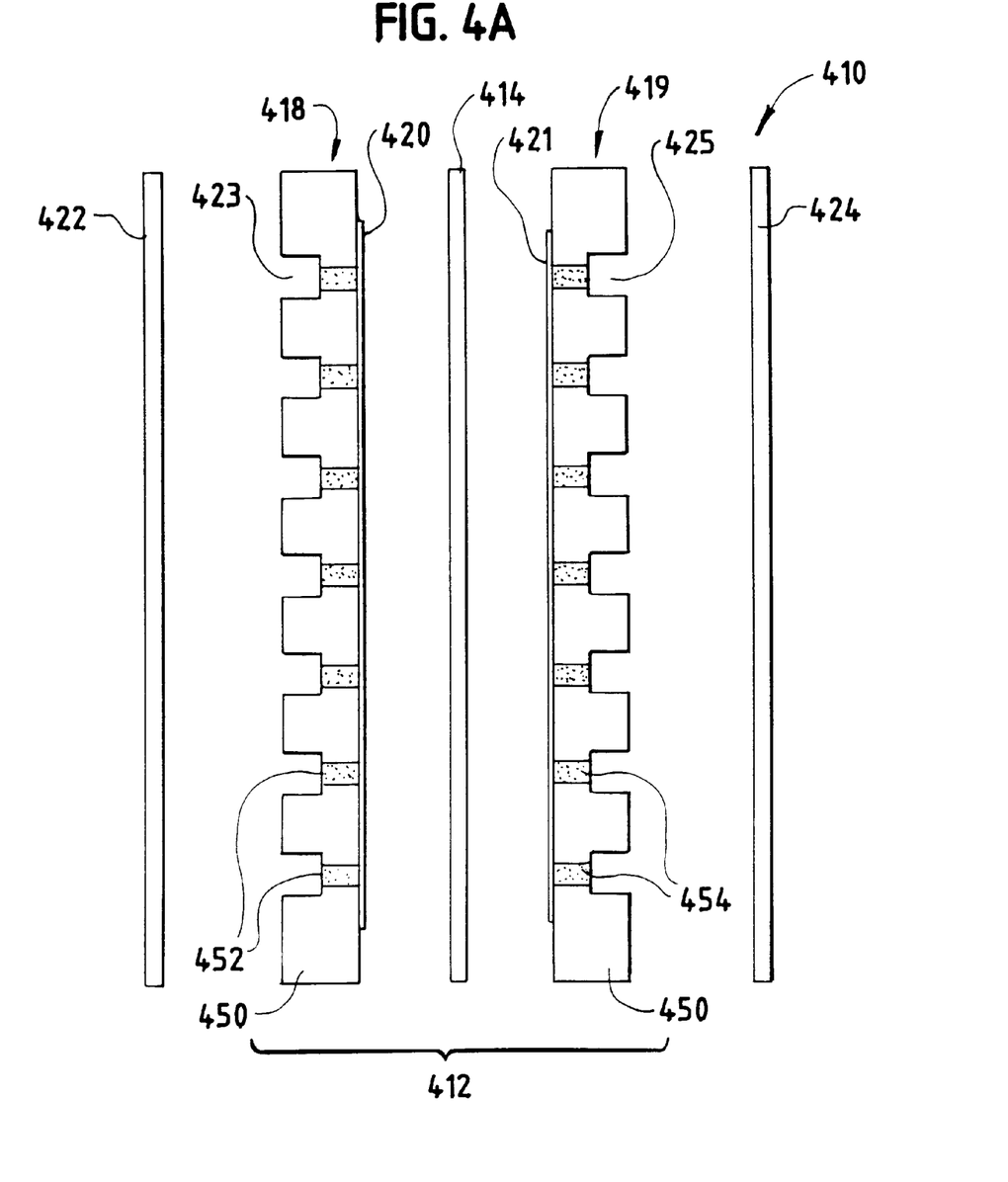
FIG. 4A is an exploded sectional view, in the direction of arrows C—C in FIG. 4B, of an electrochemical fuel cell which includes a pair of separator plates and a pair of fluid distribution layers with integral sealing capability. The fluid distribution layers include a substantially fluid impermeable sheet material having plurality of perforations in the electrochemically active region thereof, and fluid flow channels formed in a major surface thereof.
Figure 4B:
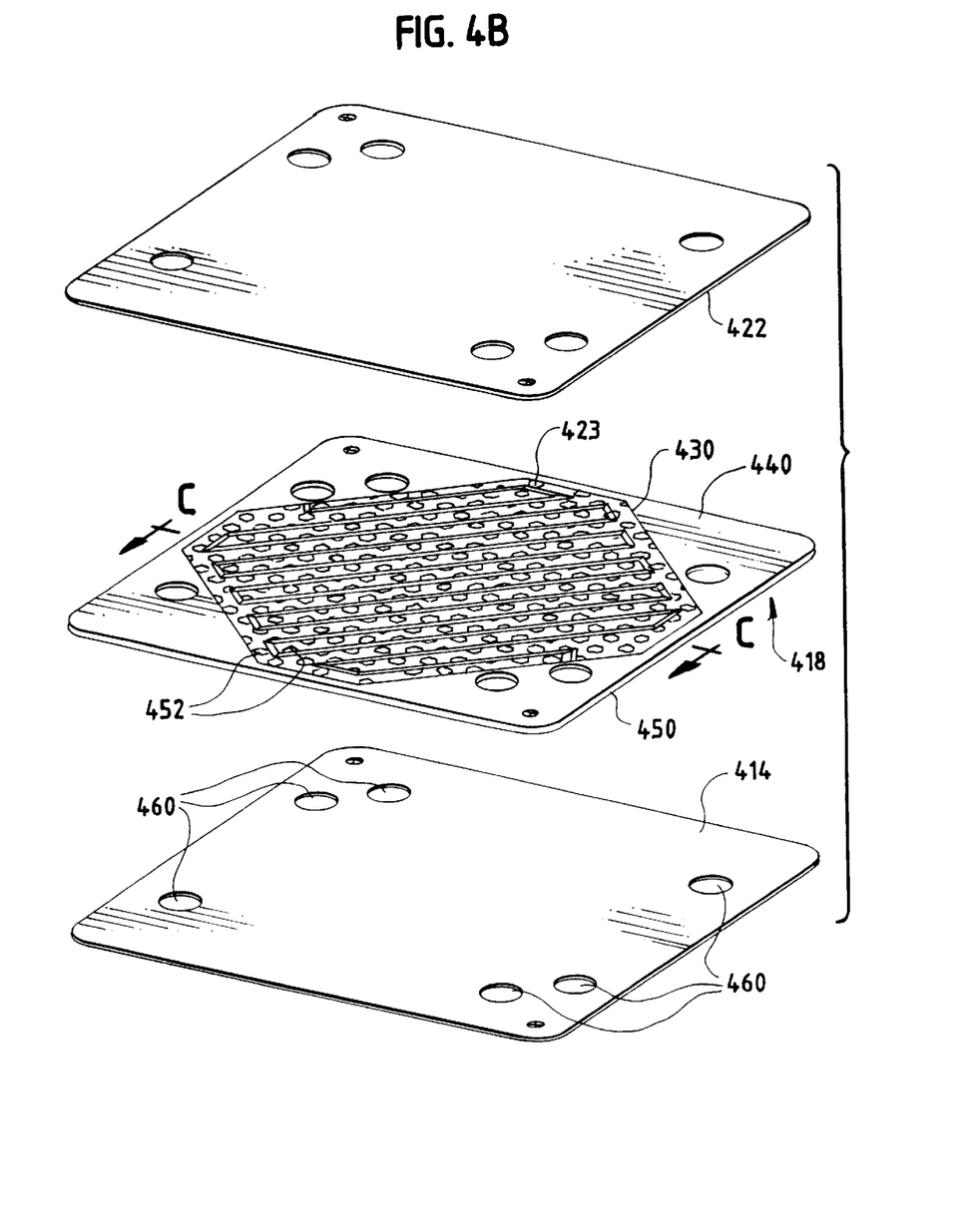
FIG. 4B is an exploded isometric view of a portion of the fuel cell of FIG. 4A.

FIG. 4A is an exploded sectional view of an electrochemical fuel cell 410, a portion of which is shown in FIG. 4B in an exploded isometric view. Fuel cell 410 is very similar to fuel cell 310 of FIGS. 3A and 3B, again including a membrane electrode assembly 412, including an ion exchange membrane 414 interposed between a pair of fluid distribution layers 418, 419, with electrocatalyst-containing layers 420, 421 defining the electrochemically active region 430 of the fluid distribution layers 418, 419. The MEA 412 is interposed between a pair of separator plates 422 and 424.

Fluid distribution layers 418, 419 each have a sealing region 440. In the illustrated embodiment, ion exchange membrane 414 superposes sealing region 440. In the electrochemically active region 430, the fluid distribution layers 418, 419 are electrically conductive and fluid permeable. In the embodiment illustrated in FIGS. 4A and 4B, fluid distribution layers include substantially fluid impermeable sheet material 450 extending into each of the active and sealing regions 430, 440, respectively. The sheet material 450 is perforated at least in the electrochemically active region, rendering it fluid permeable, to permit the passage of reactant fluid between the two major planar surfaces thereof for access to the electrocatalyst layer 420, 421 respectively. In the illustrated embodiment, the substantially fluid impermeable sheet material 450 is formed from an electrically conductive material such as graphite foil, carbon resin or a metal. The perforations 452 preferably contain an electrically conductive filler 454.

In the illustrated embodiment, each fluid distribution layer 418, 419 has an open-faced channel 423, 425 formed in its surface facing the corresponding separator plate 422, 424, respectively, and traversing the electrochemically active region 430. When assembled against the cooperating surfaces of the plates 422 and 424, channels 423 and 425 form reactant flow field passages for the fuel and oxidant, respectively.

An embodiment such as the one illustrated in FIGS. 4A and 4B integrates several functions including sealing, fluid distribution including provision of a flow field, and current collection, in a single layer or component.

Compression of sheet material 450 in fluid distribution layers 418, 419 between membrane 414 and plates 422, 424, respectively, renders the fluid distribution layers 418, 419 substantially fluid impermeable in a direction parallel to their major planar surfaces in the sealing region 440, by virtue of the fluid impermeability of the sheet material 450 which extends into the sealing region 440.

As shown in FIG. 4B, each of the membrane 414, fluid distribution layers 418, 419, reactant flow field plates 422, 424, has a plurality of openings 460 formed therein, which align when assembled to form manifolds for directing inlet and outlet fluid streams through fuel cell 410, as described above.

Figure 5:
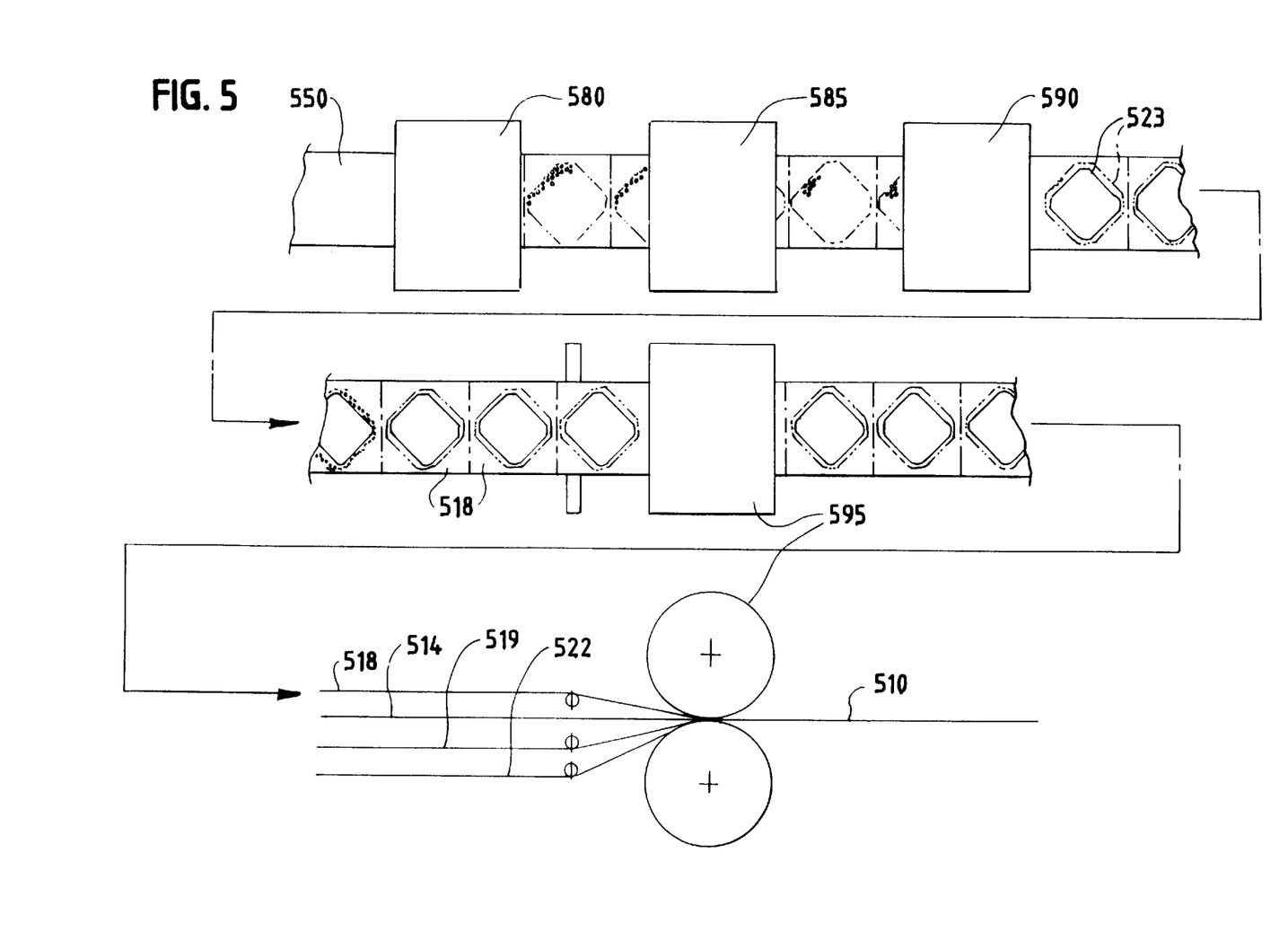
FIG. 5 is a schematic diagram illustrating a fabrication process suitable for manufacture of fuel cells with fluid distribution layers with integral sealing capability.

A wide variety of fabrication processes may be used to manufacture and assemble fuel cells of the present design. The design is believed to be suited for high throughput manufacturing processes. FIG. 5 is a schematic diagram illustrating a possible fabrication approach for a fuel cell similar to that illustrated in FIGS. 4A and 4B. FIG. 5 shows schematically the preparation of a fluid distribution layers 518, and the consolidation of two such layers 518, 519 with a catalyzed membrane 514 and a separator layer 522, in a reel-to-reel type process. For example, fluid distribution layers 518 are formed by selectively perforating a substantially fluid impermeable preformed sheet material 550 in the active region, in a perforation step 580. The sheet material could, for example, be graphite foil. In a subsequent step 585, the perforations are at least partially filled with an electrically conductive filler, such as carbon particles and a polymeric binder. A layer of conductive filler may also be deposited on one or both major surfaces of the perforated sheet material 550. Reactant flow field channels 523 may be formed in one or both major surfaces of the fluid distribution layer in step 590, for example, by embossing. A multi-layer fuel cell assembly 510 may be formed by bringing together, in a consolidation step 595, two fluid distribution layers 518, 519, with an ion exchange membrane 514, and a substantially fluid impermeable separator layer 522. The consolidation step could include a thermal lamination and/or pressure bonding process. The ion exchange membrane 514 has a electrocatalyst-containing layer on a portion of both of its major surfaces, defining the electrochemically active region. Alternatively, the electrocatalyst could be deposited on the fluid distribution layers 518, 519 prior to consolidation step 595. The assemblies may then optionally be cut into single cell units, and layered to form a fuel cell stack, wherein separator layers 522 will serve as bipolar plates. FIG. 5 illustrates how the present fuel cell design with fluid distribution layers with integral seal capability, is suitable for fabrication via a continuous, high throughput manufacturing process, with little material wastage and few individual components and processing steps.

The practical advantages of the present electrochemical cell with a fluid distribution layer having integral sealing capability is the combination of the sealing and fluid distribution functions into one fluid distribution layer, thereby reducing cost, simplifying the components, and improving their reliability. This approach reduces or eliminates the need for separate sealing components in a fuel cell assembly. A further advantage with the non-porous sheet material embodiments is the ability to control the electrochemical reaction rate by varying the number of filled holes across the active region and thereby controlling reactant access to the electrocatalyst.

In all of the above embodiments, the fuel cell may include additional layers of materials interposed between those shown, or the components shown may be multi-layer structures. Such additional layers may or may not superpose both the electrochemically active region and the sealing region. The separator plates may have optionally have raised sealing ridges projecting from the major surfaces thereof in the sealing region. In a fuel cell assembly under compression, the sealing ridges will compress the preformed sheet material in the distribution layer.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell comprising:
   (a) a pair of substantially fluid impermeable separator plates having associated therewith a compressive mechanism for urging said plates towards each other;
   (b) a pair of fluid distribution layers interposed between said separator plates, each of said fluid distribution layers having two major planar surfaces, at least one of said fluid distribution layers comprising a sealing region and an electrically conductive, fluid permeable active region, said at least one fluid distribution layer comprising a preformed sheet material extending into each of said sealing region and said active region;
   (c) an ion exchange membrane interposed between at least a portion of said fluid distribution layers;
   (d) a quantity of electrocatalyst interposed between at least a portion of each of said fluid distribution layers and at least a portion of said membrane, thereby defining said active region;
wherein said at least one fluid distribution layer is compressed by movement of said pair of separator elates towards each other, thereby rendering said at least one fluid distribution layer substantially fluid impermeable in a direction parallel to said major planar surfaces, in said sealing region.

2. The electrochemical fuel cell of claim 1 wherein said at least one of said fluid distribution layers is both of said pair of fluid distribution layers.

3. The electrochemical fuel cell of claim 1 wherein said membrane superposes at least a portion of said sealing region.

4. The electrochemical fuel cell of claim 1 wherein said at least one fluid distribution layer is electrically insulating in said sealing region.

5. The electrochemical fuel cell of claim 1 wherein said preformed sheet material is a mesh.

6. The electrochemical fuel cell of claim 5 wherein said mesh is electrically conductive.

7. The electrochemical fuel cell of claim 6 wherein said mesh contains an electrically conductive filler at least in said active region.

8. The electrochemical fuel cell of claim 6 wherein said mesh consists essentially of a metal.

9. The electrochemical fuel cell of claim 8 wherein said metal is selected from the group consisting of nickel, stainless steel, niobium and titanium.

10. The electrochemical fuel cell of claim 5 wherein said mesh is an electrical insulator, said mesh containing an electrically conductive filler at least in said active region.

11. The electrochemical fuel cell of claim 10 wherein said mesh consists essentially of a polymeric material.

12. The electrochemical fuel cell of claim 11 wherein said polymeric material is selected from the group consisting of polyethylene, polypropylene and polytetrafluoroethylene.

13. The electrochemical fuel cell of claim 1 wherein said preformed sheet material is a substantially fluid impermeable sheet material, said sheet material rendered fluid permeable in said active region.

14. The electrochemical fuel cell of claim 13 wherein said substantially fluid impermeable sheet material is perforated at least in said active region.

15. The electrochemical fuel cell of claim 14 wherein said substantially fluid impermeable sheet material is electrically conductive.

16. The electrochemical fuel cell of claim 15 wherein said substantially fluid impermeable sheet material is graphite foil.

17. The electrochemical fuel cell of claim 15 wherein said at least one fluid distribution layer comprises an electrically conductive filler within perforations in said perforated active region.

18. The electrochemical fuel cell of claim 14 wherein said substantially fluid impermeable sheet material is an electrical insulator, and said at least one fluid distribution layer comprises an electrically conductive filler within perforations in said perforated active region.

19. The electrochemical fuel cell of claim 18 wherein said substantially fluid impermeable sheet material consists essentially of a polymeric material.

20. The electrochemical fuel cell of claim 1 wherein said at least one fluid distribution layer further comprises at least one channel, for directing a fluid reactant stream, formed in at least one of said major planar surfaces thereof, said at least one channel traversing said active region.

21. The electrochemical fuel cell of claim 1 wherein at least one of said separator layers comprises at least one channel formed in a major surface thereof facing said at least one fluid distribution layer, for directing a fluid reactant stream in contact with said layer.

22. An electrochemical fuel cell comprising:
(a) a pair of substantially fluid impermeable separator plates;
(b) a pair of fluid distribution layers interposed between said separator plates, each of said fluid distribution layers having two major planar surfaces, at least one of said fluid distribution layers comprising a sealing region and an electrically conductive, fluid permeable active region, said at least one fluid distribution layer comprising a porous electrically insulating sheet material extending into each of said active region and said sealing region;
(c) an ion exchange membrane interposed between at least a portion of said fluid distribution layers;
(d) a quantity of electrocatalyst interposed between at least a portion of each of said fluid distribution layers and at least a portion of said membrane, thereby defining said active region;

wherein said porous insulating sheet material contains an electrically conductive filler in said active region and a sealing filler in said sealing region, thereby rendering said fluid distribution layer substantially fluid impermeable in said sealing region.

23. The electrochemical fuel cell of claim 22 wherein said porous electrically insulating sheet material consists essentially of a polymeric material.

24. The electrochemical fuel cell of claim 23 wherein said polymeric material is microporous.

25. The electrochemical fuel cell of claim 23 wherein said polymeric material is selected from the group consisting polyethylene, polypropylene and polytetrafluoroethylene.

26. The electrochemical fuel cell of claim 22 wherein said porous electrically insulating sheet material is a mesh.

27. The electrochemical fuel cell of claim 22 wherein said porous electrically insulating sheet material is glass fiber mat.

28. The electrochemical fuel cell of claim 22 wherein said sealing filler comprises a flow processible material.

29. The electrochemical fuel cell of claim 28 wherein said flow processible material is an elastomer.

30. The electrochemical fuel cell of claim 29 wherein said elastomeric flow processible material is silicon rubber.

* * * * *